(12) United States Patent
Lindtner et al.

(10) Patent No.: US 8,770,606 B2
(45) Date of Patent: Jul. 8, 2014

(54) CONTROL ARM FOR A VEHICLE

(75) Inventors: Ernst Lindtner, Baden (AT); Josef Schellnegger, Weiz (AT)

(73) Assignee: Magna International Inc., Aurora, Ontario (CA)

(*) Notice: Subject to any disclaimer, the term of this patent is extended or adjusted under 35 U.S.C. 154(b) by 0 days.

(21) Appl. No.: 13/496,011

(22) PCT Filed: Sep. 14, 2010

(86) PCT No.: PCT/EP2010/005623
§ 371 (c)(1),
(2), (4) Date: Apr. 28, 2012

(87) PCT Pub. No.: WO2011/029630
PCT Pub. Date: Mar. 17, 2011

(65) Prior Publication Data
US 2012/0217717 A1    Aug. 30, 2012

(30) Foreign Application Priority Data

Sep. 14, 2009 (DE) .................. 10 2009 041 478

(51) Int. Cl.
*B60G 7/00*     (2006.01)
*B60G 3/04*     (2006.01)

(52) U.S. Cl.
USPC .................................................. 280/124.134

(58) Field of Classification Search
USPC ............... 280/124.134, 124.135; 72/324, 347
See application file for complete search history.

(56) References Cited

U.S. PATENT DOCUMENTS 5,492,001 A    2/1996    Sasaki et al.

FOREIGN PATENT DOCUMENTS

| DE | 102005006673 A1 | 6/2006 |
|----|-----------------|--------|
| DE | 102006028713 B3 | 11/2007 |
| DE | 202009016416 U1 | 4/2010 |
| EP | 2000335 A2      | 12/2008 |
| FR | 2706096 A1      | 12/1994 |
| JP | 58145314 A      | 8/1983 |
| JP | 2003285121 A    | 10/2003 |

*Primary Examiner* — Faye M. Fleming
(74) *Attorney, Agent, or Firm* — Dickinson Wright PLLC

(57) ABSTRACT

A component, especially a control arm for a vehicle, includes a base wall and a passage extending away from said base wall, and in particular, a control arm lug. A method for producing such a component includes shortening a deep-drawn contour which connects one side of the base wall to an inner contour of a passage in the longitudinal direction of the passage by means of upsetting.

13 Claims, 3 Drawing Sheets

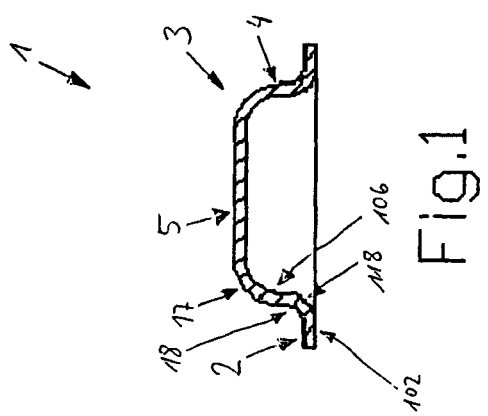
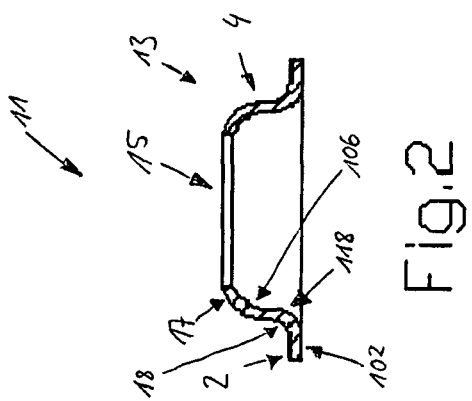
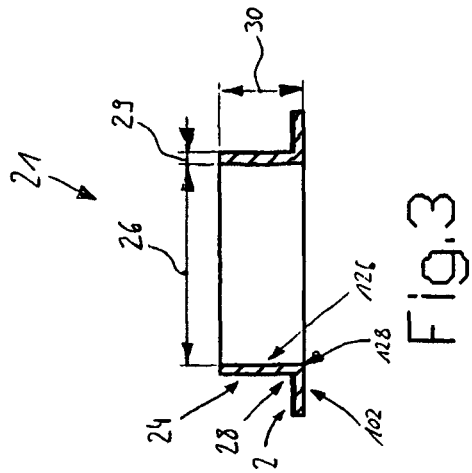

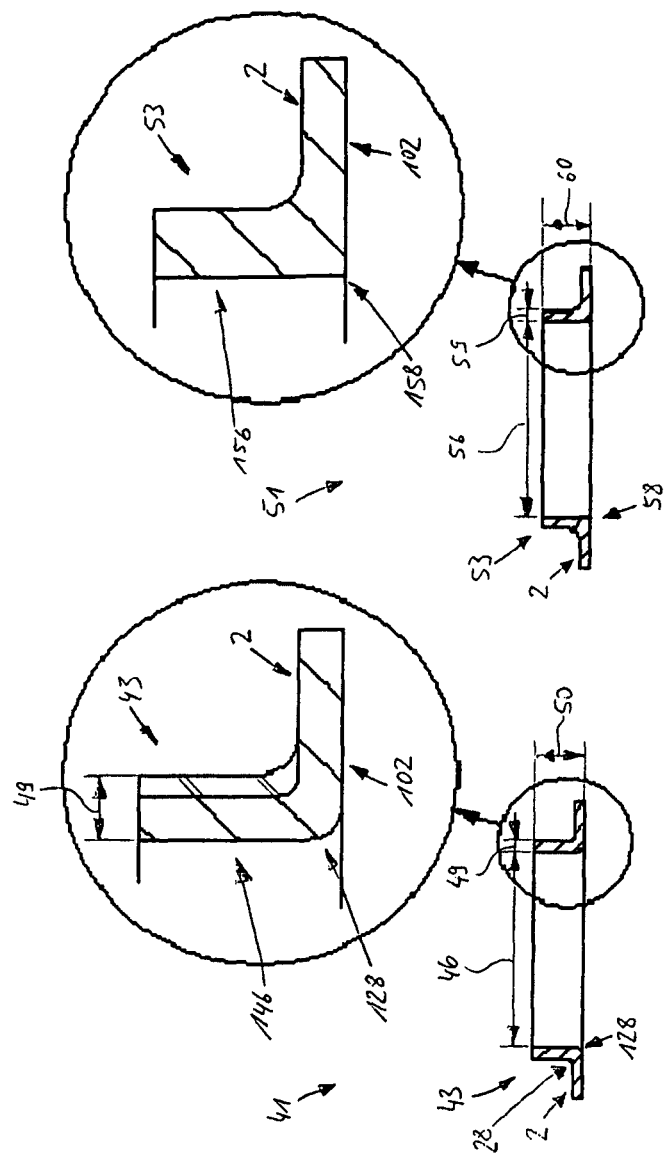

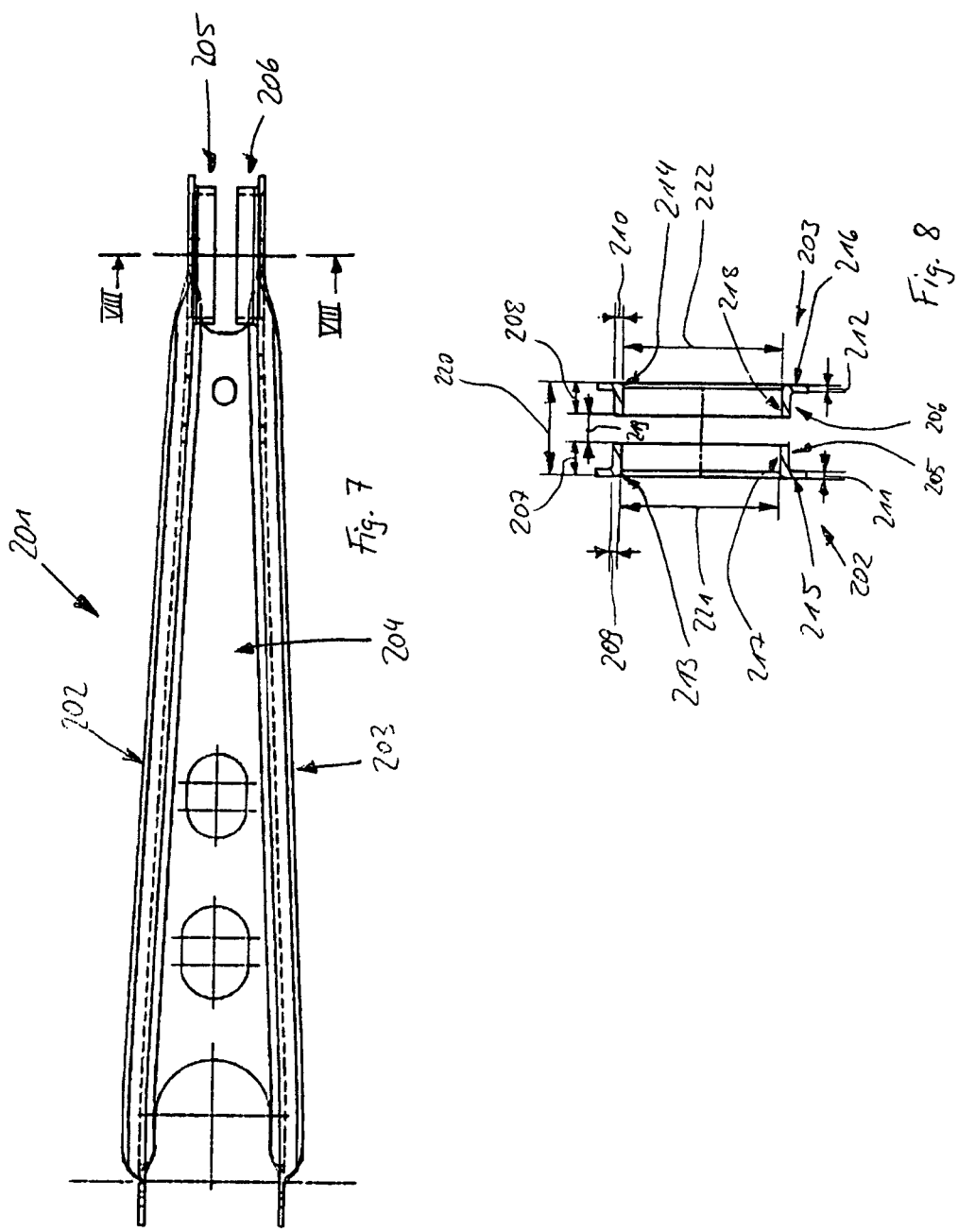

CONTROL ARM FOR A VEHICLE

CROSS REFERENCE TO RELATED APPLICATIONS

This application claims priority to International Patent Application Ser. No. PCT/EP10/005623 filed on Sep. 14, 2010, entitled "Component, Especially Control Arm For A Vehicle" and DE Application No. 10 2009 041 478.9 filed on Sep. 14, 2009, entitled "Bauteil, Insbesondere Lenker Für Ein Fahrzeug," the entire disclosures of all of these applications being considered part of the disclosure of this application and are hereby incorporated by reference.

TECHNICAL FIELD

The present invention relates to a component, especially a control arm for a vehicle, comprising a base wall and a passage extending away from the base wall, especially a control arm lug. The invention further relates to a method for producing such a component.

BACKGROUND OF THE INVENTION

DE 10 2005 006 673 A1 discloses a component having a base wall and a passage extending away from the base wall. The component is formed of metal and acts as a carrier for a gear made of a plastic material molded onto an outer collar of the component. In order to enable pivoting of the gear, a ball bearing has been fixed to the outer circumference of the passage or the inner collar.

The component is made by first forming a hemispherical passage from a flat blank by means of deep-drawing. A hole is punched into the center of the hemispherical passage, which has a diameter that is smaller than half of the largest inner diameter of the hemispherical passage. Subsequently, the hemispherical passage is shaped by deep-drawing so as to form a cone-shaped passage. Then, the same is shaped by deep-drawing so as to form a cylindrical passage. Owing to the intermediate step, the dimensional change or deformation of the material per the drawing action is less as if the cylindrical passage would have directly been formed of the hemispherical passage. After that, the wall thickness of the cylindrical passage is enlarged by decreasing its height. The inner passage diameter remains constant.

An outer deep-drawn contour which connects one side of the blank to a radial outer contour of the passage is of a relatively large radius so that the ball bearing cannot entirely be positioned to the outer circumference of the passage. For that reason, the large diameter is removed and an undercut is formed. In order to facilitate shaping of such undercut, the large radius is reduced as intermediate step.

After also having formed the outer collar and having provided the plastic gear, the ball bearing is pressed onto the outer contour of the passage or the inner collar.

DE 10 2006 028 713 B3 teaches a component which is a control arm for a vehicle. A plurality of passages in the form of collars having internal bearing supporting surfaces extend from a base wall. A method is suggested in which the component is made of a metal strip and is maintained connected to the metal strip until completed.

SUMMARY OF THE INVENTION

The present invention is based on the object to design a component comprising a base wall and a passage projecting therefrom in such a manner that the passage may accommodate or receive an element, such as a bearing, in a good manner, and to provide for a method by which such a component can be produced as easy as possible.

According to the invention, advantages over the prior art are provided by a method comprising the features of claim 1.

Due to the shortening of the deep-drawn contour and the associated displacing of the inner contour to the side of the base wall, a component can be obtained having a passage which has, in contrast to a passage of the same length and unshortened deep-drawn contour, a longer inner contour that may especially act as bearing seat. A longer bearing seat can hold a bearing better, wherein the surface pressure between bearing and passage can simultaneously be reduced. If the component is, for example, a control arm for a vehicle, extending the bearing seat length by a few millimeters can already result in a distinct improvement of the bearing characteristics, especially of the guiding behavior of a wheel. The deep-drawn contour can be adjusted irrespective of the base wall thickness by means of the method according to the invention.

Preferably, the deep-drawn contour may be rounded in the longitudinal direction of the passage and its rounding radius can be reduced by such upsetting to a value of about 2 mm or less, preferably to a value of about 1 mm or less, and most preferably to a value of 0.5 or less. If the rounding radius was first of a value of, for example, 5 mm, reducing to a value of about 2 mm, 1 mm or even 0.5 mm yields a distinct length gain of the inner contour, especially when the space available for the passage is small, as is often the case in modern vehicles. When the passage length must not have more than, e.g. 8 mm, a bearing seat length gain of 3 mm, 4 mm or even 4.5 mm is considerable.

Most preferably, the inner span of the passage can be diminished simultaneously with the shortening of the deep-drawn contour. Accordingly, shortening the deep-drawn contour and changing the inner span is done in one integrated fabrication step, thus saving time. Moreover, shortening the deep-drawn contour and changing the inner span can be done with less energy, especially as in the case of simultaneously executing these procedures, the influence of material hardening may be smaller than in the case of consecutively executing them. Besides, when executed simultaneously, the two procedures may benefit from each other, thus causing a synergy effect.

According to a further development of the invention, the wall thickness of the passage can be increased simultaneously together with decreasing or shortening the deep-drawn contour. Thus, decreasing the deep-drawn contour and increasing the wall thickness is done in one integrated fabrication step, thus saving time. Besides, increasing the wall thickness of the passage and decreasing the deep-drawn contour may benefit from each other. In other words, there is a synergy effect. Beyond that, the two procedures can be performed with less energy, as material hardening may be less than in case where the two procedures are executed one after the other.

Favorably, the passage can be calibrated to its scheduled final dimensions simultaneously with the shortening of the deep-drawn contour. Hence, it follows that the shortening of the deep-drawn contour and the calibration is done in one integrated productions step, thus saving time.

Preferably, deep-drawing may give the initial passage a roughly cylindrical shape with a flat bottom. Thus, the passage is provided with a good stock of material for the following production steps and is, in the case where a cylindrical end shape is desired, well-approximated to such a cylindrical end shape.

Preferentially, the entire flat bottom may be punched out. As a result, hardly any dimensional changes or deformations are required when the passage is, for example, to be penetrated cylindrically so as to obtain a straight cylindrical shape on the part of the created opening of the bottom.

It is especially advantageous that, as a next step, after having punched out the bottom, the passage may be penetrated cylindrically, thereby obtaining a straight cylindrical shape on the part of the created opening of the bottom.

Most favorably, the passage wall thickness can be increased, starting from the wall thickness of the initial passage, by at least 0.3 mm, preferably by at least 0.4 mm, or most advantageously by at least 0.6 mm. Such increase in the passage wall thickness enhances its load capacity.

Preferably, the passage wall thickness can be enhanced to a value which is larger than the wall thickness of the base wall. Thus, it is possible to select a basic material which corresponds to the desired wall thickness of the base wall, even though a passage is desired having a wall thickness which is larger than the wall thickness of the base wall.

Most favorably, the wall thickness of the passage can be enhanced to a value which is at least by 0.2 mm larger than the wall thickness of the base wall, preferably at least by 0.3 mm larger, or most preferably at least by 0.5 mm larger. If the wall thickness of the base wall is in the region of, for example, 2 mm, it is a benefit to have the wall thickness of the passage enhanced by 0.2 mm, by 0.3 mm or even by 0.5 mm.

According to a further development of the invention, the wall thickness of the passage can be enhanced, prior to shortening the deep-drawn contour, by diminishing the inner span of the passage. Hence, it follows that shortening the deep-drawn contour and reducing the inner diameter is done in one integrated production step, thus saving time. Besides, shortening the deep-drawn contour and reducing the inner diameter may benefit from each other, i.e. there is a synergy effect. Beyond that, it is possible to save energy, as material hardening may be less for an integral production step than in the case where reducing the inner diameter and shortening the deep-drawn contour is done one after the other.

Most advantageously, a steel of a tensile strength of 500 $N/mm^2$ or more may be used to produce the component. Surprisingly, the inventive method can be performed in a good manner despite the high tensile strength of the steel material.

Advantages over the prior art are also provided by means of a component comprising the features of independent claim 14.

As the deep-drawn contour is formed by upsetting, the structural conditions of the material of which the deep-drawn contour has been formed are of good strength. If the material is a metal it has been further consolidated by the upsetting deformation process.

Furthermore, advantages over the prior art are additionally provided by means of a component comprising the features of claim 15, according to which the deep-drawn contour can be rounded in the longitudinal direction of the passage and its rounding radius may be about 2 mm or less, preferably about 1 mm or less, or most preferably about 0.5 mm or less. Thus, just a minor proportion of the passage length accounts for the deep-drawn contour. If the length of the passage must not exceed 8 mm, as may be the case in modern vehicles with limited installation space, a deep-drawn contour of about 2 mm, 1 mm or 0.5 mm represents only a small part of the passage length. If the passage is a control arm lug, there is a good proportion of the passage length available for the inner contour acting in this case as bearing seat. Thus, it is possible to achieve good bearing characteristics, especially a good guiding behavior for a wheel directed by the control arm.

Advantageously, the passage may be of a larger wall thickness than the base wall. Thus, the component is, on the whole, light with regard to its weight despite such strengthened passage.

According to a further development of the invention, the passage may be of a wall thickness which is at least by 0.2 mm larger than the wall thickness of the base wall, preferably at least by 0.3 mm larger, or most preferably at least by 0.5 mm larger. If the base wall has, for example, a wall thickness of 2 mm, an increase of 0.2 mm, of 0.3 mm or even of 0.5 mm in the wall thickness provides a distinct strengthening of the passage.

Preferably, the component may be made of a steel of a tensile strength of 500 $N/mm^2$ or more. Thus, the component can be, on the whole, of high strength and, despite that, of light weight with regard to its weight.

BRIEF DESCRIPTION OF THE DRAWINGS

Embodiments of the invention are shown in the drawings and will be described in the following, wherein:

FIGS. 1 to 6 show various production steps when producing an inventive component according to a first embodiment; the resulting component being shown in a longitudinal sectional view, respectively, and FIG. 6 showing the finished or complete component;

FIG. 7 is a plan view of an inventive component according to another embodiment; and FIG. 8 is a sectional view of the component shown in FIG. 7 taken along line VIII-VIII.

DETAILED DESCRIPTION

FIGS. 1 to 6 illustrate how an inventive component according to a first embodiment is produced.

The component can be made of either a blank or a strip. Preferably, the blank or strip is of constant material thickness. It can be made of a metal material, e.g. steel.

A pot is deep-drawn from the blank or strip, preferably of constant wall thickness, if need be in a plurality of steps. Thus, a component 1 is created, comprising a base wall 2 and an initial passage 3, as is shown in FIG. 1. The pot made by deep-drawing and the base wall 2 are formed by the blank or the strip material surrounding the initial passage 3. Accordingly, the initial passage 3 was formed by deep-drawing a region of the base wall.

Initial passage 3 is of a larger depth, i.e. length, and of a larger diameter than the finished passage as intended. As a result, material for any later deformation or dimensional change steps is being kept in reserve. Further, the initial passage 3 is of a similar shape as the intended final form. According to this embodiment, it includes a substantially cylindrical sheathing 4, as the completed passage is to comprise a cylindrical sheathing, i.e. is to be a cylindrical collar. Thus, less deformation becomes necessary in order to give the initial passage 3 its finished shape. Moreover, the initial passage 3 includes a substantially flat bottom 5. Hence, it follows that only a little material is required for bottom 5, and stretching the material during deep-drawing is minimized, e.g. if compared to a rounded bottom.

Sheathing 4 of the initial passage 3 includes a portion 17 adjoining bottom 5 and extending radially inwards. The portion 17 is rounded in this embodiment. Moreover, it includes a portion 18 extending radially outwards and adjoining the base wall 2. The portion 18 extending radially outwards has also been rounded in this embodiment.

The initial passage 3 includes a deep-drawn contour 118 which connects one side 102 of base wall 2 to an inner contour 106 of sheathing 4. According to the illustration of FIG. 1, the side 102 of base wall 2 is a lower side. Initial deep-drawn contour 118 may have a radius in an amount corresponding to the wall thickness of the base wall plus 1 mm to 2 mm. The wall thickness of the base wall may be 3 mm, for example.

The bottom 5 will be removed, e.g. by punching. As a result, the component 11 shown in FIG. 2 is provided with a passage 13 having a hole 15.

The portion 17 extending radially inwards and now adjoining hole 15 is being widened by penetration, i.e. straightened, if need be in several steps. The radius of portion 18, extending radially outwards is slightly reduced substantially by being bended, such as by means of a blank holder. Thus, the component 21 as shown in FIG. 3 is obtained which comprises a passage having a sheathing 24 which is straight, apart from a portion 28 extending radially outwards of a reduced radius. As the sheathing of component 11 shown in FIG. 2 was already substantially cylindrical, only relatively little deformation work had been required to widen portion 17 extending radially inwards so that cylindrical penetration caused just a slight stretching of the material. Consequently, the wall thickness of passage of component 21 shown in FIG. 3 still remained substantially the same over its length. The radius of the deep-drawn contour 128 is now still large, e.g. of an amount approximately corresponding to the wall thickness of the base wall.

The passage shown in FIG. 3 has a wall thickness 29, a height, or length 30, and its inner contour 126 has an inner diameter or an inner span 26. The height or length of the passage is reduced and its wall thickness is enhanced by either urging or upsetting back, with its inner span 26 being maintained. Thus, component 31 shown in FIG. 4 is obtained which has a passage 33 of enhanced wall thickness 39 and reduced height or length 40. Prior to upsetting, the structural conditions of the component were a typical structural image for deep-drawing showing the flow of material while forming initial passage 3 by means of deep-drawing. The structural conditions have been changed by just widening the portion 17 extending radially inwards in its former region by means of a transverse flow of material. Due to upsetting, the structural conditions and, thus, the structural image have changed. In particular, the flow lines caused by deep-drawing moved further apart from each other and extend in a less straight manner. In other words, the structural image caused by upsetting is typical for upsetting and distinctive with regard to the previous structural image.

The passage 33 is further pressed or upset back, if need be in several steps, thus further reducing its height or length and further enhancing its wall thickness. Simultaneously, its inner diameter is being reduced. Thus, the component 41 as shown in FIG. 5 is obtained, having a passage 43 of an enhanced wall thickness 49, a further reduced height or length 50 and a reduced inner span 46. Due to further upsetting, the structure of passage 43 has further changed in a characteristic manner, as can be derived from the structural image.

An enlargement of FIG. 5 shows how much passage wall thickness had so far been gained. The amount of gain has been indicated by double-line hatching. The wall thickness of passage 43 is already considerably larger than the wall thickness of base wall 2. An inner deep-drawn contour 128 which connects one side 102 of the base wall 2 to an inner contour 146 of passage 43 maintained its large radius during upsetting.

The passage is now further being urged or upset back, the inner span of the passage simultaneously being reduced and the passage being calibrated to its final dimension, especially its inner deep-drawn contour and its inner contour. In doing so, the wall thickness of the passage is further enhanced and the radius of the deep-drawn contour is minimized. It is minimized to a value of no more than 2 mm, preferably no more than 1 mm and most preferably no more than about 0.5 mm. Thus, the finished formed part 51 as shown in FIG. 6 is obtained which has a passage 53 with an inner contour 156 of a further reduced inner span 56, a further enhanced wall thickness 59, a further reduced height or length 60 and a deep-drawn contour 158 of a more tight curvature. Reducing the radius of the deep-drawn contour 158 caused, with regard to the longitudinal extension of passage 53, a reduction of the axial length of the deep-drawn contour and, simultaneously, a displacement of the inner contour 156, especially its initial point adjacent to the deep-drawn contour, towards the side 102 of the base wall. Accordingly, the inner contour gained length, owing to the shortening of the deep-drawn contour. Alternatively, it could be said that the axial length of the deep-drawn contour has been reduced and, simultaneously, the inner contour 156 has been extended towards the side 102 of the base wall.

When passage 51 acts, for example, as a bearing lug and its inner contour 156 acts as a bearing seat, the axial shortening of the deep-drawn contour means a considerable gain in the bearing seat length, if compared to the case in which the axial length of the deep-drawn contour had not been shortened or reduced. To reduce the radius to a value that is smaller than the wall thickness of the base wall, e.g. to 2 mm, to 1 mm or even to 0.5 mm, yields a considerable gain in the bearing seat length if the height or length of the finished passage is 8 mm, for example. Such a significant reduction of the radius or such significant gain in the bearing seat length that might also be expressed as a percentage causes a significant improvement of the bearing characteristics, as the bearing is suspended by the passage via a larger length, thus changing its position to a lesser extent while taking up forces. At the same time, the surface pressure by which the bearing is being suspended can be reduced, thus reducing the passage load.

The wall thickness of the finished passage 53 may have been enhanced with regard to the wall thickness of the initial passage 53, for example, by at least 0.3 mm, by at least 0.4 mm or even by at least 0.6 mm. The wall thickness 59 of the finished passage 53 may be larger than the wall thickness of base wall 2 or of the initial material by, for example, at least 0.2 mm, by at least 0.3 mm or even by at least 0.5 mm. The wall thickness of the base wall might e.g. be about 2 mm, about 2.5 mm or about 3 mm.

In addition, by way of the inventive method, the inner contour of the passage can be formed with high contouring accuracy, especially a high cylindricity, and with a wall thickness that is substantially constant over the length, especially in the longitudinal portion of the inner contour. As a result, a bearing evenly fits to the inner contour of the passage, i.e. there is a homogenous surface pressure behavior, thus further improving the stability holding the bearing in its position. Further, there are just minor bearing push out force fluctuations and a good correlation between push in force and push out force. As close tolerances are conceivable, the bearing seat is easily reproducible.

If the component is, for example, a control arm for a vehicle, the driving behavior can be improved for example by about 0.5 to 0.75 points of an evaluation scale ranging from 1 to 10 when the control arm was manufactured in accordance with the invention.

Moreover, a component of such an improved bearing characteristic can be manufactured economically, as "tailored rolled blanks" are not used as initial material, but a material of a consistent equal strength can be used. Despite this, an enhanced passage can be obtained with a wall thickness that can be adjusted substantially irrespective of the wall thickness of the base wall.

Owing to the enhancement of the passage wall, same is able to take up even high forces without breaking down. In other words, it is possible to use a material for manufacturing the component that has a wall thickness that would be too thin for the passage. Accordingly, the component as a whole may be of light construction having, despite that, a passage of sufficient wall thickness.

The method according to the invention is even suitable for the use of high-strength steels. High-strength steels may be used having a tensile strength of more than 400 N/mm$^2$ or even of a tensile strength of more than 500 N/mm$^2$. For instance, ferritic bainitic steels may be used, such as HDT450F and HDT560F, or steels of the group commercially labeled FB450, FB540, FB560, or FB590.

FIG. 7 is a plan view of an inventive component according to another embodiment. The component is designed as a control arm 201 of a vehicle and is used to guide a wheel. The control arm 201 is of an approximately U-shaped cross-sectional form with lateral shells 202, 203 opposing each other and being combined to each other by means of a back 204.

The control arm 201 is an integrally formed mold piece manufactured by means of the above-described inventive method, especially have the passages forming the control arm lugs 205, 206 thereof been manufactured in accordance with said method.

FIG. 8 is a sectional view of control arm 201 taken along line VIII-VIII in FIG. 7, the collar-like control arm lugs 205, 206 being shown in a longitudinal sectional view. The control arm lugs have a height or length 207, 208 of e.g. 9.5 mm and an enhanced wall thickness 209, 210 of e.g. 2.5 mm. In contrast thereto, the side shells 202, 203, i.e. the base walls, have wall thicknesses 211, 212 of e.g. 2 mm. Inner deep-drawn contours 213, 214 which connect an outer surface 215, 216 of the corresponding side shells 202, 203 to a radially inner contour 217, 218 of the corresponding control arm lug 205, 206, respectively, have a rounding radius of 0.5 mm. Thus, the bearing seat length of this embodiment is 9 mm.

A clear width of a distance 219 between the bearing lugs 205, 206 is, for example, 8 mm. At the height of the sectional view, the outer faces 215, 216 of the side shells 202, 203 have a distance 220 of, for example, 27 mm. The distance 219 between the bearing lugs 205, 206 may be either a necessary or a given minimum distance. The distance 220 of the outer faces 215, 216 of the side shells 202, 203 may either be a structurally given distance or a maximum distance determined by the available space. Control arm lugs 205, 206 are hollow-cylindrical and have an inner diameter 221, 222 of e.g. about 45 mm.

The structure of the material section of which the inner deep-drawn contours 213, 214 are respectively formed, is formed by upsetting or urging back. Accordingly, the material portions are of structural conditions having a characteristic structural image for upsetting or urging back. In other words, the fact that upsetting or urging back has taken place can be derived from the structural image.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

The invention claimed is:

1. A method for producing a component having a base wall and a passage extending from the base wall and formed from the base wall, the forming of the passage comprising the following steps:
    forming an initial passage having a wall thickness and a deep-drawn contour which connects one side of the base wall to an inner contour of the passage, and
    upsetting the passage,
    wherein during the upsetting of the passage, the deep-drawn contour is shortened in the longitudinal direction of the passage and the inner contour is displaced towards the side of the base wall to increase in a radial direction the entire length of the wall thickness of the passage.

2. The method according to claim 1, wherein the deep-drawn contour is rounded in the longitudinal direction of the passage and its rounding radius is reduced by said upsetting to a value of about 2 mm or smaller.

3. The method according to claim 1, wherein an inner span of the passage is reduced simultaneously to the shortening of the deep-drawn contour in the longitudinal direction.

4. The method according to claim 1, wherein the wall thickness of the passage is increased simultaneously to the shortening of the deep-drawn contour.

5. The method according to claim 1, wherein the passage is calibrated to its intended final dimensions simultaneously to the shortening of the deep-drawn contour in the longitudinal direction.

6. The method according to claim 1, wherein the initial passage obtains a rough cylindrical shape having a flat bottom by means of deep-drawing.

7. The method according to claim 6, wherein the entire flat bottom is punched out.

8. The method according to claim 6, wherein the passage is penetrated cylindrically as next step after punching out the bottom.

9. The method according to claim 1, wherein, starting from the wall thickness of the initial passage, the wall thickness of the passage as a whole is increased by at least 0.3 mm.

10. The method according to claim 1, wherein the wall thickness of the passage is increased to a value which is larger than the wall thickness of the base wall.

11. The method according to claim 1, wherein the wall thickness of the passage is increased to a value which is larger than the wall thickness of the base wall by at least 0.2 mm.

12. The method according to claim 1, wherein prior to shortening the deep-drawn contour the wall thickness of the passage is enhanced while reducing an inner span of the passage.

13. The method according to claim 1, wherein a steel having a tensile strength of 500 N/mm$^2$ or more is used to produce the component.

\* \* \* \* \*